United States Patent
Otto et al.

(10) Patent No.: US 6,988,311 B2
(45) Date of Patent: Jan. 24, 2006

(54) METHOD OF GROUNDING A JACKETED METAL TUBE USING A CLIP WELDED TO THE JACKET

(75) Inventors: Torsten Otto, Ahnatal (DE); Kurt Apel, Neuenstein (DE)

(73) Assignee: TI Automotive (Fuldabruck) GmbH, Fuldabruck (DE)

( * ) Notice: Subject to any disclaimer, the term of this patent is extended or adjusted under 35 U.S.C. 154(b) by 0 days.

(21) Appl. No.: 10/615,335

(22) Filed: Jul. 8, 2003

(65) Prior Publication Data

US 2004/0077194 A1   Apr. 22, 2004

(30) Foreign Application Priority Data

Jul. 30, 2002   (EP) ................................. 02017124

(51) Int. Cl.
  *H01R 43/00* (2006.01)
(52) U.S. Cl. ............................ 29/825; 29/865; 174/92; 248/74.1; 439/690
(58) Field of Classification Search ................... 29/828, 29/859, 861, 825; 174/352, 84 R; 439/98, 439/100, 932, 862, 97, 947; 248/74.1–74.3, 248/73, 71, 58–65
See application file for complete search history.

(56) References Cited

U.S. PATENT DOCUMENTS

| | | | | |
|---|---|---|---|---|
| 3,565,374 A | * | 2/1971 | Jones | 248/74.3 |
| 4,536,644 A | * | 8/1985 | Thalmann | 219/535 |
| 4,790,067 A | * | 12/1988 | Grindle | 29/748 |
| 5,002,244 A | * | 3/1991 | Holbury et al. | 248/68.1 |
| 5,544,849 A | * | 8/1996 | Peterson et al. | 248/74.1 |
| 5,850,056 A | * | 12/1998 | Harwath | 174/40 CC |
| 6,126,119 A | * | 10/2000 | Giangrasso | 248/58 |
| 6,406,330 B2 | * | 6/2002 | Bruce | 439/609 |
| 6,669,150 B2 | * | 12/2003 | Benoit et al. | 248/74.2 |

\* cited by examiner

*Primary Examiner*—Minh Trinh
(74) *Attorney, Agent, or Firm*—Herbert Dubno

(57) ABSTRACT

A method of grounding a tube to a chassis wherein a plastic clip made conductive by the incorporation of conductive particles therein, is clamped onto the jacket of metal automotive vehicle tubing so that projections on the clip penetrate through the jacket to engage the outer surface of the metal tube. The clip body is welded to the jacket to hermetically seal the region of contact between the clip and the metal.

7 Claims, 3 Drawing Sheets

METHOD OF GROUNDING A JACKETED METAL TUBE USING A CLIP WELDED TO THE JACKET

FIELD OF THE INVENTION

Our present invention relates to a method of grounding a metal tube which is covered by a jacket, sheath, coating or layer of electrically nonconductive plastic or synthetic resin for use, especially in the transport of a liquid or gaseous medium in a motor vehicle. More particularly the invention relates to the grounding of a motor vehicle fuel line to a metal part of the vehicle, especially the vehicle chassis utilizing an electrically conductive clip. The invention also relates to a clip for carrying out the method and to the assembly which consists of the chassis of the vehicle, the jacketed metal line and the clip which grounds that fuel line to the chassis.

BACKGROUND OF THE INVENTION

In the use of metal tubing for fuel lines, from a safety point of view, it is important that the fuel line be grounded to the chassis. For that purpose a clip which can be clamped onto the fuel line may be used. However, in the past systems in which a conductive clip was used to ground a metal fuel line chassis, it was found to be necessary to remove the electrically insulating or nonconductive material on the exterior of the fuel line at least in the region of the clip and this led to a reduced corrosion resistance and wear resistance or abrasion resistance of the metal tube.

OBJECTS OF THE INVENTION

It is, therefore, the principal object of the present invention to provide a method of grounding a metal tube surrounded by an electrically nonconductive plastic layer whereby the aforementioned drawbacks can be eliminated.

Another object of this invention is to provide a method of grounding such a metal tube and particularly a tube carrying a gas or liquid as a vehicle fluid, to a metal part such as a chassis of the vehicle, whereby the life of the metal tube is not diminished and particularly whereby there is no increase in corrosive attack or abrasive attack on the metal tube.

It is also an object of this invention to provide a clip which can be used to practice the method of the invention.

Still another object of the invention is to provide an improved mounting for a metal tube in a motor vehicle and particularly a fuel tube therein.

SUMMARY OF THE INVENTION

According to the invention a clip for grounding a metal tube to a metal part can be composed at least in part of a plastic which has been made electrically conductive and has a penetrating portion, preferably consisting of one or more projections and/or teeth, which can be pressed through a nonconductive plastic layer surrounding the metal tube into contact with the outer surface of the latter. According to the invention, moreover, the clip is welded to this nonconductive plastic layer so that there is no point at which there is access between the outer surface of the metal tube and the exterior. The welding, according to the invention, is a material-integration welding in which the material of the clip and the material of the nonconductive plastic layer form an intimate point, preferably such that no clear interface is discernable between them.

More particularly, the method of the invention for grounding the metal tube surrounded by the electrically nonconductive plastic layer to a metal part comprises the steps of:

(a) providing a clip at least in part composed of a plastic which has been made electrically conductive and having a penetrating portion;

(b) applying the clip to the metal tube surrounded by the electrically nonconductive plastic layer and pressing the penetrating portion through the plastic layer into direct electrically conducting contact with the metal tube;

(c) thereafter welding the clip to the plastic layer; and (d) electrically connecting the clip to the metal part.

The plastic layer can be a plastic coating which can be applied by any conventional deposition technique to the metal tubing or can be a layer or covering which is bonded in some other way to the outer surface of the metal tubing. It may also be a sheath or jacket which is extruded thereon or simply drawn over or otherwise applied to the metal tubing.

Because the plastic of the clip has been made electrically conductive, where the penetrating portion or formation contacts the outer surface of the metal tubing, there is an effective electrical connection between the metal tubing and the electrically conductive clip so that the ground can be made through the clip to the chassis or the like. In that case the metal part is the chassis of the motor vehicle, the metal tubing conducts a vehicle fluid and the penetrating portion can have one or more projections or teeth adapted to bite into and pass through the synthetic resin layer.

The clip may be made electrically conducting by the incorporation of metal fibers, especially steel fibers therein.

The material-to-material bond between the clip and the layer can be formed by rotation welding, ultrasonic welding, vibration welding, and/or induction welding. The induction welding, especially, can be made more effective if the clip, in addition to the metal fiber content, has a glass fiber content. In the induction welding, the metal fibers can be inductively heated and can melt the plastic of the clip where it is in contact with the plastic of the layer which is also melted so that the two material fuse together.

The clip or clip body is joined to the layer by welding and, according to the invention, the material-to-material connection between the layer and the clip body can be such that a demarcation between the two is not discernable after the welding operation. While the welding can involve rotational welding, whereby the clip body and the layer may be relatively rotated about the axis of the tube at a high speed to cause friction melting of the portions of the layer and clip body in contact with one another and ultrasonic welding can involve heating of the clip body and the layer by application of ultrasonic energy thereto, both can be used in combination with one another and with vibrational welding and especially in combination with induction welding whereby the metal fibers are heated by magnetic induction from an induction coil.

The invention has the advantage that simply by compressing the clip body around the metal tube and its jacket, an effective electrical connection can be made between the tube and the clip by the penetration of the projecting formation of the clip body through the insulating jacket to the outer metal surface of the tube, while a hermetic seal for the penetrating region can be obtained by the material-to-material bond forming the weld. Even direct contact with electrolytes like salt water and acetic solutions are prevented from reaching the metal so that corrosion cannot occur. The clip preferably is a sleeve with a longitudinal slit and the penetrating projections can be pins or teeth. Preferably the slit sleeve extends by more than 180° around the tubing so that the sleeve can be clamped onto the latter and is held in place thereon even in the nonwelded state. The plastic of the jacket or layer and the plastic of the clip body are preferably the same and particularly suitable for such purposes is polyamide 12 (nylon 12).

According to a further feature of the invention the clip body is reinforced with glass fibers to increase the strength thereof.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
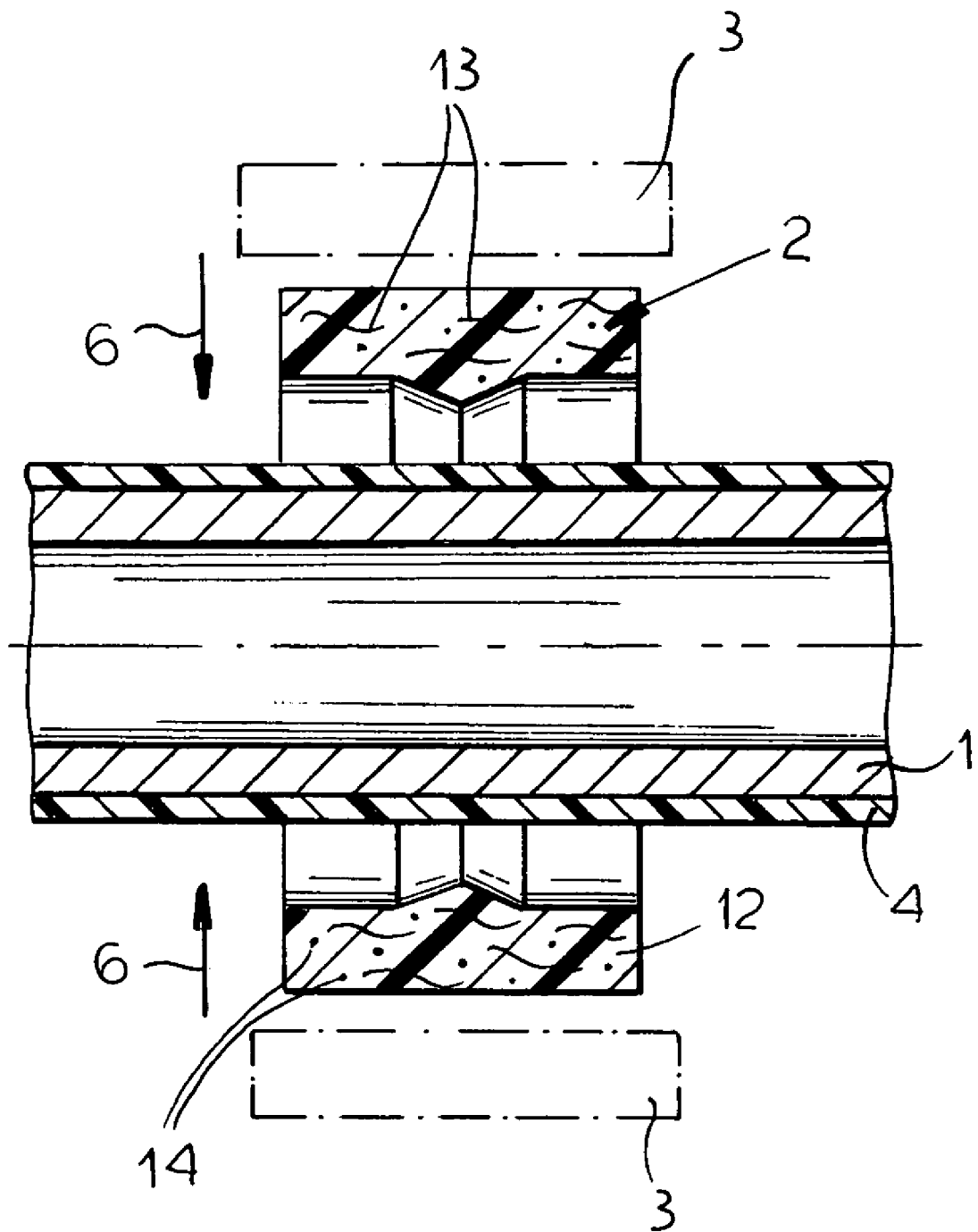
FIG. 1 is a cross sectional view illustrating an initial step in the method of the invention utilizing ultrasonic welding apparatus.
Figure 2:
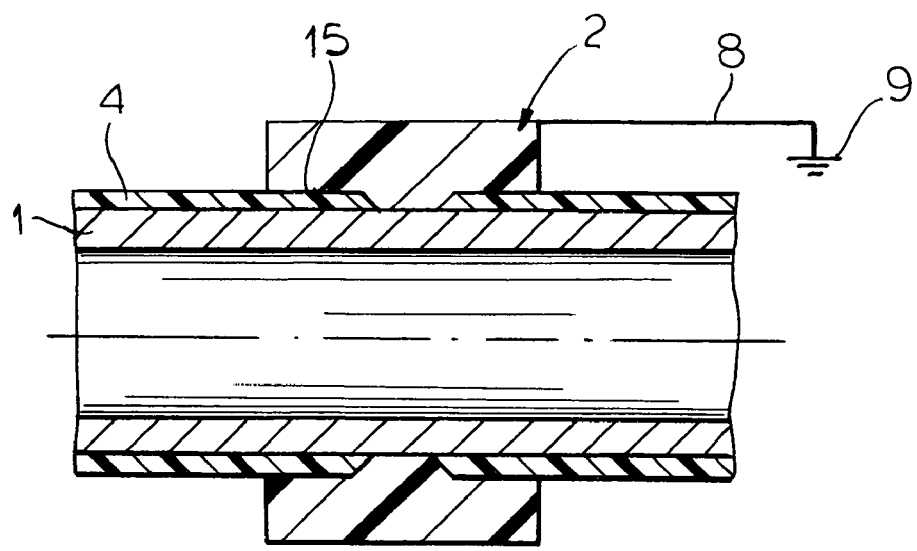
FIG. 2 is a diagrammatic illustration of the clip and metal tubing after formation of the connection.
Figure 3:
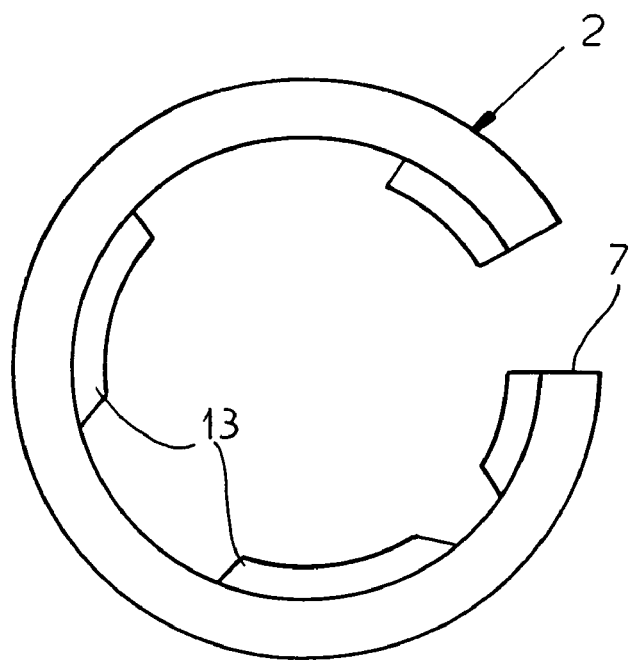
FIG. 3 is an end view of the clip body.
Figure 4:
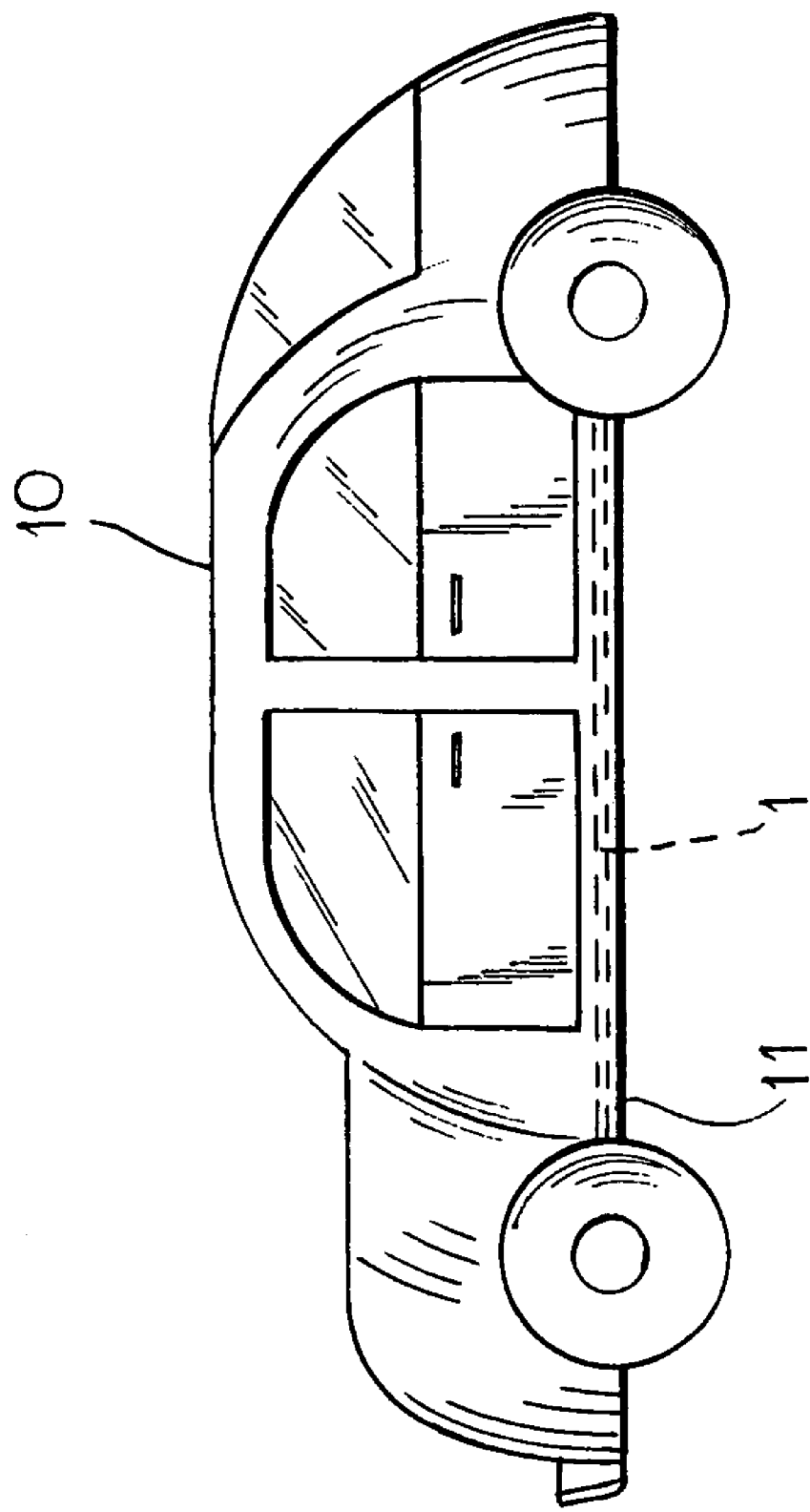
FIG. 4 is a diagram showing application of the invention to automotive tubing.

FIG. 1 shows a metal tube 1 which can be a fuel line for a motor vehicle and which is provided with a plastic coating, jacket or sheath 4, here a jacket or sheath of nylon-12. At a region to be provided with a chassis ground, a clip 2 is applied. The clip 2, as can be seen from FIG. 3, has a longitudinal slit 7 so that it can be compressed around the tube 1 and thereby clamped around the latter. The clip 2 is electrically conducting and through it a chassis ground can be made as represented by the connection 8 to the chassis 9 in FIG. 2. The clamping apparatus is represented by the jaws 3 of an ultrasonic heating unit which can be applied in the direction of the arrows 6.

As a general matter the metal tube 1 can serve to transport a liquid or gaseous medium, especially motor vehicle fuel in a vehicle such as the vehicle 10 with its chassis 11. The metal tube 1 is shown to extend in that vehicle from a fuel tank to an engine, for example.

The clip 2 comprises a clip body 12 and a penetrating portion 5 unitary therewith and in the form of spaced apart members 13 such as teeth of triangular cross section. The sleeve extends around the tubing over more than 180° and preferably over 270° or more. The plastic from which the clip is constituted is likewise nylon-12 and to render it electrically conductive, the metal fibers, especially seal fibers 13 can be incorporated therein. Reinforcing glass fibers 14 can also be included in the clip.

In the ultrasonic actuator 3 the clip is compressed and plastically deformed against the tubing causing the teeth 13 to penetrate through the layer 4 and the clip 2 (see FIG. 2) so that where the clip and layer contact one another, e.g. at 15, the two materials fuse together and are practically indistinguishable. The teeth 13, where they press against the tube 1 tend to flatten out as a result, where the metal of the tube is in direct contact with the clip 2, a hermetic seal is provided between the clip body and the layer 4 to prevent penetration of corrosive substances into this region. The connection 8, 9 to the chassis represents any convenient electrical connection including a cable, terminal arrangement, screw lug or the like.

We claim:

1. A method of grounding a metal tube which serves to conduct a liquid or a gas on a vehicle and is surrounded by an electrically nonconductive plastic layer, to a metal part formed by a chassis of the vehicle which comprises the steps of:
   (a) providing a clip at least in part composed of a plastic which has been made electrically conductive and having a penetrating portion fabricated with one or more projections adapted to penetrate said plastic layer;
   (b) applying said clip to the metal tube surrounded by the electrically nonconductive plastic layer and pressing said penetrating portion through said plastic layer into direct electrically conducting contact with the metal tube;
   (c) welding said clip to said plastic layer; and
   (d) electrically connecting said clip to said metal part.

2. The method defined in claim 1 wherein said clip is welded to said plastic layer by a rotational welding.

3. The method defined in claim 1 wherein said clip is welded to said plastic layer by ultrasonic welding.

4. The method defined in claim 1 wherein said clip is welded to said plastic layer by vibrational welding.

5. The method defined in claim 1 wherein said clip is welded to said plastic layer by induction welding.

6. The method defined in claim 1 wherein said clip is made electrically conductive by the incorporation of metal fibers in the plastic thereof.

7. The method defined in claim 6, further comprising reinforcing said clip by incorporating glass fibers therein.

* * * * *